(12) United States Patent
Shiraogawa et al.

(10) Patent No.: US 6,903,788 B2
(45) Date of Patent: Jun. 7, 2005

(54) OPTICAL FILM AND A LIQUID CRYSTAL DISPLAY USING THE SAME

(75) Inventors: Miki Shiraogawa, Ibaraki (JP); Hironori Motomura, Ibaraki (JP); Ikuo Kawamoto, Ibaraki (JP)

(73) Assignee: Nitto Denko Corporation, Ibaraki (JP)

(*) Notice: Subject to any disclaimer, the term of this patent is extended or adjusted under 35 U.S.C. 154(b) by 0 days.

(21) Appl. No.: 10/188,330

(22) Filed: Jul. 3, 2002

(65) Prior Publication Data

US 2003/0071947 A1 Apr. 17, 2003

(30) Foreign Application Priority Data

Jul. 5, 2001 (JP) ........................................ 2001-205199

(51) Int. Cl.$^7$ ..................... G02F 1/1335; G02F 1/1333
(52) U.S. Cl. ........................................ 349/115; 349/122
(58) Field of Search ..................... 349/113–115, 122, 349/69; 359/494–495, 487

(56) References Cited

U.S. PATENT DOCUMENTS

| | | | |
|---|---|---|---|
| 3,709,580 A | 1/1973 | Fugitt et al. ............... 359/493 |
| 4,796,160 A | 1/1989 | Kahn .......................... 362/19 |
| 5,184,881 A | 2/1993 | Karpen | |
| 5,481,385 A | 1/1996 | Zimmerman et al. ......... 349/62 |
| 5,579,134 A | 11/1996 | Lengyel ....................... 349/62 |
| 5,600,462 A | 2/1997 | Suzuki et al. ................. 349/62 |
| 5,627,926 A | 5/1997 | Nakamura et al. ........... 385/36 |
| 5,721,603 A | 2/1998 | De Vaan et al. ............ 349/194 |
| 5,828,488 A | * 10/1998 | Ouderkirk et al. .......... 359/487 |
| 5,863,114 A | 1/1999 | Nagatani et al. ............. 362/27 |
| 5,995,288 A | 11/1999 | Kashima et al. ............ 359/599 |
| 6,074,741 A | 6/2000 | Murata et al. .............. 428/327 |
| 6,111,696 A | * 8/2000 | Allen et al. ................. 359/495 |
| 6,163,351 A | 12/2000 | Nakayama ................... 349/61 |
| 6,354,709 B1 | * 3/2002 | Campbell et al. ............ 362/31 |
| 6,356,391 B1 | * 3/2002 | Gardiner et al. ........... 359/628 |
| 6,404,469 B1 | * 6/2002 | Kitagawa et al. ............ 349/96 |
| 6,417,831 B2 | 7/2002 | Kashima ...................... 349/62 |
| 2002/0003593 A1 | 1/2002 | Arakawa et al. ............. 349/65 |

FOREIGN PATENT DOCUMENTS

| | | |
|---|---|---|
| EP | 0 588 504 | 3/1994 |
| EP | 0 881 509 A2 | 12/1998 |
| EP | 0 908 745 A1 | 4/1999 |
| JP | 02-257188 | 10/1990 |
| JP | 05-169015 | 7/1993 |
| JP | 08-094833 | 4/1996 |
| JP | 10-319233 | 12/1998 |
| WO | WO94/29765 | 12/1994 |

OTHER PUBLICATIONS

U.S. Appl. No. 09/577,040, filed May 24, 2000, Toshio Nakamura et al.
European Search Report in Appln. No. EP 00110898.4 (corresponding to U.S. Appl. No. 09/577,040).

* cited by examiner

*Primary Examiner*—Toan Ton
(74) *Attorney, Agent, or Firm*—Westerman, Hattori, Daniels & Adrian, LLP

(57) ABSTRACT

An optical film having excellent light utilization efficiency and high brightness, and a liquid crystal display using the optical film. The optical film is formed by laminating integrally a brightness enhancement film (A) that separates natural light into transmitted light and reflected light and a collimating film (B) having an uneven portion on a surface thereof. Since an air interface is eliminated by the integral lamination of the brightness enhancement film and the collimating film, stray light is reduced, and the brightness enhancement film has an improved efficiency in reflecting and polarizing light; thereby, enhancing the brightness.

25 Claims, 7 Drawing Sheets

US 6,903,788 B2

OPTICAL FILM AND A LIQUID CRYSTAL DISPLAY USING THE SAME

TECHNICAL FIELD

The present invention relates to an optical film that can efficiently utilize light and achieve high brightness, and a liquid crystal display using the optical film.

PRIOR ART

Due to the advantages provided by the characteristics such as reduction in the thickness and weight and the lowered power consumption, liquid crystal displays (LDCs) are used widely as flat panel displays indispensable in the era of highly developed information and communications and the applications thereof are increasing year after year. More particularly, with the 21st century coming close, uses of large type LCDs (such as, monitor cameras or televisions) have increased remarkably. Under these circumstances, characteristics required for the current LCDs include: 1) high brightness, 2) wide visual angle, 3) fast response, and 4) high definition. Among them, the high brightness is particularly required. Brightness of a typical laptop type personal computer (PC), which was from 70 $cd/m^2$ to 100 $cd/m^2$ a few years ago, is now 150 $cd/m^2$.

Due to preference for thin LCDs, single-lamp-type backlights tend to have cold cathode ray tubes (CFLs) with small diameters (typically 2 mmφ or less for a laptop type PC) and light-transmission plates that become thin with the decreasing thickness of the CFLs. A recent LCD module including such a backlight is as thin as 5 mm to 6 mm. Under these circumstance, there are two contradicting requirements: providing light-weight thin LCDs and securing the brightness. Since LDPs become larger and enhanced in brightness, improvement of the components at the backlights (e.g., light-transmission plates and CFLs) are not sufficient for securing brightness required in the LCDs.

A method for enhancing brightness of a backlight is enhancement of front brightness by converging light beams emitted in a direction oblique with respect to the direction of the backlight beams to the vicinity of a normal direction. When a single-lamp-type backlight is used, two collimating films are generally used to converge the light beams coming from all directions to the normal direction. Since thickness of this collimating film is approximately 150 μm, use of two films will considerably increase the thickness of the LCD.

When a single-lamp-type backlight is used, two collimating films (7) are required to enhance the front brightness, as shown in FIG. 3. When the brightness in a case using two collimating films as shown in FIG. 3 is defined as 1, the brightness can be enhanced to 1.2–1.3 times by inserting a brightness enhancement film (4) in place of a polarizing plate (5) disposed below, as shown in FIG. 4. When a double-lamp-type backlight is used, a collimating film (7) may be used to enhance the front brightness, as shown in FIG. 6. When the brightness obtained under this condition is defined as 1, the brightness can be enhanced to 1.3–1.4 times by inserting a sheet of the brightness enhancement film (4) in place of the polarizing plate (5) disposed below, as shown in FIG. 7. When the brightness obtained without using any collimating films is defined as 1, the brightness can be enhanced to 1.5–1.6 times by inserting a sheet of the brightness enhancement film in place of the polarizing plate disposed below. Accordingly, it is known that stray light is generated further as sheets of the collimating films are increased; thereby, degrading the reflection polarization efficiency of the brightness enhancement film.

However, since high front brightness cannot be obtained if the collimating film for reducing the light emitted in the oblique direction and enhancing the front brightness is removed, the use of the collimating film is required in many cases.

DISCLOSURE OF THE INVENTION

It is an object of the present invention to provide an optical film that can use light efficiently and achieve high brightness, and an LCD apparatus using such an optical film, by integrally laminating a brightness enhancement film and a collimating film; namely, by reducing the number of sheets of the collimating films and decreasing spacing between the film sheets.

In order to achieve the above object, the optical film of the present invention is formed by integrally laminating a brightness enhancement film (A) for separating natural light into transmitted light and reflected light, and a collimating film (B) having an uneven portion on a surface thereof.

According to the optical film of the present invention, it is preferable that the light passing through the brightness enhancement film (A) is linearly-polarized light. Also, it is preferable that the brightness enhancement film (A) is a laminated body of a cholesteric liquid crystal layer and a λ/4 plate.

In the above embodiment, it is preferable that the collimating film (B) has a prism portion.

In the above embodiment, it is preferable that a brightness enhancement film (A) and the collimating film (B) are integrally laminated, where the brightness enhancement film (A) separates natural light into transmitted light as linearly-polarized light and reflected light containing reusable circularly-polarized light, while the collimating film (B) has a prism portion on a surface thereof.

In the optical film of the present invention, it is preferable that the brightness enhancement film (A) is produced by laminating integrally a cholesteric liquid crystal layer, a λ/4 plate and an absorption dichroic polarizing plate in this certain order.

In the above embodiment, it is preferable that the cholesteric liquid crystal layer has an oriented film of a cholesteric liquid crystal polymer or an oriented liquid crystal layer thereof supported on a film substrate. It is especially preferable that it has a combined structure of two or more liquid crystal layers, and the liquid crystal layers have different reflection wavelengths.

Further, in the optical film of the present invention, it is preferable that the brightness enhancement film (A) and the collimating film (B) are integrally laminated to each other by using an adhesive or pressure-sensitive adhesive.

Further, in the optical film of the present invention, it is preferable that resin is coated on the brightness enhancement film and a prism pattern is transferred to the resin so that the film is provided with a light-condensing (collimating) function.

Further, in the optical film of the present invention, it is preferable that the collimating film converges the light emitted at an angle of 30° to 80° with respect to the normal to a vicinity of the normal direction.

Further, in the optical film of the present invention, it is preferable that the prism of the collimating film is in a chevron shape and that the apex angle of the chevron is in a range of 20° to 80°.

Furthermore, in the optical film of the present invention, it is preferable that the prism of the collimating film is in a wave shape.

Next, a liquid crystal display of the present invention is characterized in that an optical film formed by laminating integrally a brightness enhancement film (A) and a collimating film (B) is disposed on at least one side of a liquid crystal cell, where the brightness enhancement film (A) separates natural light into transmitted light and reflected light while the collimating film (B) has an uneven portion on a surface thereof. The above-described optical films are preferably used.

Furthermore, a liquid crystal display of the present invention has a backlight.

PREFERRED EMBODIMENTS OF THE INVENTION

An optical film of the present invention is produced by integrally laminating a brightness enhancement film (A) for separating natural light into transmitted light and reflected light and a collimating film (B) having an uneven portion on a surface thereof. A preferably used optical film is produced by laminating integrally a brightness enhancement film (A) for separating natural light into light transmitted as a linearly-polarized light and reflected light containing reusable circularly-polarized light, and a collimating film (B) having a prism portion on a surface thereof.

As the brightness enhancement films (A) used in the present invention, any films can be used without any specific limitations, as long as the films separate natural light into transmitted light and reflected light. The examples include an optical film for separating natural light into transmitted light as linearly-polarized light and reflected light containing reusable circularly-polarized light, or an optical film for transmitting a linearly-polarized light having a predetermined polarization axis while reflecting other light.

Examples of the former films include cholesteric liquid crystal layers, specifically, oriented films of a cholesteric liquid crystal polymer or the oriented liquid crystal layers supported on film substrates, which have characteristics of reflecting counterclockwise or clockwise circularly-polarized light while transmitting other light. Examples of the latter films include a multi-layered thin film of a dielectric material or a multi-layered laminate of thin films different from each other in the refractive index anisotropy, which transmit linearly-polarized light of a predetermined polarization axis while reflecting other light.

The above-described brightness enhancement film that transmits linearly-polarized light having a predetermined polarization axis can transmit light efficiently while suppressing an absorption loss caused by the light-transmission plate since the transmitted light enters directly the polarizing plate, with the polarization axis aligned. On the other hand, although a brightness enhancement film (such as, cholesteric liquid crystal layer) that transmits circularly-polarized light allows light to directly enter the polarizer, it is preferable that the transmitted circularly-polarized light is converted into linearly-polarized light via a retardation plate and then enters the polarizing plate, from an aspect of suppressing the absorption loss. By using a λ/4 plate as the retardation plate, circularly-polarized light can be converted into linearly-polarized light. Therefore, it is preferable that the brightness enhancement film is produced by laminating integrally a cholesteric liquid layer, a λ/4 plate, and an absorption dichroic polarizing plate successively in this order.

FIG. 1 is a schematic view showing an embodiment of the brightness enhancement film 4 of the present invention. A cholesteric liquid layer (3), a λ/4 plate (2), and an absorption dichroic polarizing plate (1) are laminated integrally in this order.

On the other hand, a collimating film (B) is not limited specifically as long as it has an uneven portion on a surface thereof. Any collimating film (B) can be used without any specific limitations as long as the film has an uneven surface and the front brightness becomes high when the uneven surface is disposed opposite to its viewing side. For example, the film can have a prism portion. In addition to the prism shape, various kinds of shapes forming convexity or concavity can be used as the uneven shape, and the examples include pyramids such as a triangular pyramid and a quadrangular pyramid, polyhedrons such as a triangular prism and a quadratic prism, a sphere, a hemisphere, or an elliptical sphere. These uneven shapes can be formed directly by using particles, or formed indirectly by transferring an uneven shape formed using particles.

Further, the uneven shape can have a variation in the refractive index. It is also preferable that the light is efficiently condensed by using the differences of the refractive indexes. Variation in the refractive index can be used for changing the light path; thereby, enabling to condense light.

Methods for varying the refractive index include a two-step co-polymerization process, i.e., polarization in which a monomer for producing a low refractive-index polymer is dispersed in a liquid/gaseous phase in a gel obtained by partially polymerizing a crosslinking monomer for producing a high refractive-index polymer. A collimating film can be produced also by arranging spherical or cylindrical polymers with a varied refractive index so that the polymers lie flat, or by forming the polymer on a film.

For the collimating film having the prism portion, it is preferable that the light emitted at an angle of 30° to 80° with respect to the normal direction is converged to the vicinity of the normal direction in order to improve the light-condensing ability. The shape of the prism is not limited specifically. Wave shapes or chevron shapes can be suitably used. In a case of chevron shape, the angle formed by two tilted faces of the prism (apex angle) is from 20° to 80°, preferably from 30° to 70°. Formation of the prism portion becomes difficult if the angle is less than 20°, and the light-condensing ability may deteriorate if the angle is more than 80°.

The absorption dichroic polarizing plate used in the present invention, i.e., a polarizing plate in which a dichroic material is adsorb-oriented, has a basic configuration that a transparent protective film as a protective layer is adhered via an appropriate adhesive layer such as an adhesive layer containing a vinyl alcohol-based polymer etc. on at least one surface of a polarizer that is made of a polyvinyl alcohol-based polarizing film or the like containing a dichroic material and being formed by dyeing, crosslinking, stretching and drying a hydrophilic plastic film in an ordinary manner.

The polarizer (polarizing film) can be prepared appropriately by treating a hydrophilic plastic film in an appropriate order and technique (such as, dyeing by means of dichroic materials like iodine and a dichroic dyestuff, stretching, and crosslinking), and the polarizer transmits linearly-polarized light when natural light enters. It is especially preferable that the polarizer has excellent light transmittance and polarization. Although there is no specific limitation, the polarizer has a thickness of 1 μm to 80 μm, and preferably, 2 μm to 40 μm. The plastic film can be swelled in a water bath or the like before being dyed.

As the hydrophilic plastic film, a polymer film of e.g., polyvinyl alcohol or partially formalized polyvinyl alcohol is preferable. More particularly, a polyvinyl alcohol-based film is preferable in light of its excellent dyeing property by iodine. The polyvinyl alcohol-based film may be prepared by forming a film by a flow-casting method that a polyvinyl alcohol-based polymer dissolved in water or an organic solvent is flowed to form a film, a casting method, an extrusion method, or any other appropriate methods.

Any appropriate transparent film can be used for a protective film material to form a transparent protective layer on at least one surface of the polarizer (polarizing film). Particularly preferred films contain polymers with excellent properties such as transparency, mechanical strength, thermal stability and moisture-blocking property. Although the polymers are not specifically limited, examples include acetate-based resins, such as, triacetylcellulose, polyester-based resins, polyethersulfone-based resins, polycarbonate-based resins, polyamide-based resins, polyimide-based resins, polyolefin-based resins, and acrylic resins.

A transparent protective film preferred especially from the aspect of polarizing characteristics and durability is a tri-acetylcellulose film having a surface saponified with an alkali substance or the like. Although the thickness of the transparent protective film can be determined arbitrarily, it is in general 500 $\mu$m or less, preferably from 5 $\mu$m to 300 $\mu$m, and preferably from 5 $\mu$m to 150 $\mu$m for providing a thin polarizing plate. Transparent protective films formed on both surfaces of a polarizing film are not necessarily made of identical polymers.

A transparent protective film used for the protective layer can be treated to provide properties (such as, hard coating, antireflection, anti-sticking, diffusion and anti-glaring), as long as the purposes of the present invention are not sacrificed. Hard coating treatment is applied, for example, to prevent scratches on the surfaces of the polarizing plate. A surface of the transparent protective film can be applied with a coating film of a cured resin with excellent hardness and smoothness, e.g., an ultraviolet-cure type resin based on silicone or the like.

Antireflection treatment may be applied to prevent reflection of external light on the surface of the polarizing plate, and an anti-reflection film or the like can be formed in a known method for this treatment. Anti-sticking treatment is applied to prevent adherence of adjacent layers. Anti-glare treatment is applied to prevent visibility of light transmitted through the polarizing plate from being hindered by external light reflected on the polarizing plate surface. Anti-glare treatment can be carried out by providing microscopic asperities on a surface of a transparent protective film in an appropriate manner, e.g., by roughening the surface by sand-blasting or embossing, or by blending transparent particles.

There is no specific limitation on a method to adhere the polarizer (polarizing film) and the transparent protective film as a protective layer. Adhesion can be applied, for example, by using adhesives such as an adhesive comprising vinyl alcohol-based polymer, or an adhesive comprising at least the vinyl alcohol-based polymer and a water-soluble agent to crosslink the vinyl alcohol-based polymer, such as boric acid, borax, glutaraldehyde, melamine and oxalic acid. Such an adhesive layer can be formed by, for example, applying and drying an aqueous solution, and an additive or a catalyst (such as, an acid) can be blended in preparation of the aqueous solution if required.

Specific examples of the retardation plates ($\lambda$/4 plates) used in the present invention include birefringent films, oriented films of liquid crystal polymers, and oriented layers of liquid crystal polymers supported by films. The birefringent films can be prepared by stretching films of any suitable polymers such as polycarbonate, polyvinyl alcohol, polystyrene, polymethyl methacrylate, polyolefins including polypropylene, polyalylate, and polyamide. Thickness of the retardation plate ($\lambda$/4 plate) produced by stretching a film is not limited specifically, although it is usually from 10 $\mu$m to 200 $\mu$m, and preferably from 20 $\mu$m to 100 $\mu$m. The thickness of the retardation plate ($\lambda$/4 plate) made from a liquid crystal polymer is not limited specifically, although the thickness is usually from 0.1 $\mu$m to 5 $\mu$m, and preferably from 0.5 $\mu$m to 2 $\mu$m.

In the brightness enhancement film of the present invention, examples of the liquid crystals for forming the liquid crystal layer include low molecular weight liquid crystals and crosslinking liquid crystal monomers that show a nematic phase or a smectic phase at a room temperature or a high temperature, or a liquid crystal polymers that show a nematic phase or a smectic phase at a room temperature or high temperature. The low molecularlweight liquid crystals and the crosslinking liquid crystal monomers are based on, for example, cyanobiphenyl, cyanophenyl-cyclohexane, cyanophenyl ester, benzoic acid phenylester, phenylpyrimidine; and their mixtures. The above-mentioned crosslinking liquid crystal monomers are usually subjected to an orientation treatment, and thereafter, crosslinked to be polymerized in a crosslinking treatment using heat or light beams appropriately. Among them, preferred layers reflect counterclockwise or clockwise linearly-polarized light while transmitting other light, and the examples include cholesteric liquid crystal layers, especially an oriented film of a cholesteric liquid crystal polymer and the oriented liquid crystal layer supported on a film substrate.

A cholesteric liquid crystal layer can be provided also by combining layers different in the reflection wavelength and it can be configured by overlapping two or at least three layers. The thus obtained retardation plate can reflect circularly-polarized light in a wide wavelength range including a visible light region; and this can provide transmission of circularly-polarized light in a wide wavelength range.

Such a cholesteric liquid crystal polymer layer may be formed in a conventional method used for orientating a low molecular weight liquid crystal. For example, it can be formed by forming a thin film made of polyimide, polyvinylalcohol polyester, polyalylate, polyamideimide, polyetherimide having a thickness of 0.1 $\mu$m to 5.0 $\mu$m on a supporting substrate having a thickness of 10 $\mu$m to 100 $\mu$m. Then, a liquid crystal polymer is provided on an appropriate oriented thin film that is previously rubbed with a rayon cloth or the like. The liquid crystal polymer is then heated to a temperature that is equal or higher than a glass transition temperature but lower than an isotropic phase transition temperature. Then, it is cooled down below the glass transition temperature to make a glass condition, while the liquid crystal polymer molecules are in Grandjean-orientation. Thus, a hardened layer with the fixed orientation is formed.

As the supporting substrate, a mono-layer, a laminated film formed of a plastic film such as triacetylcellulose, polyvinyl alcohol, polyimide, polyalylate, polyester, polycarbonate, polysulfone, polyether sulfone, amorphous polyolefin, modified acrylic polymer, and epoxy resin or a glass plate, can be used. For decreasing the thickness of the substrate, a plastic film is preferable.

From an aspect of preventing disorder of orientation or deterioration of transmission ratio, or for widening a wavelength range of selective reflection, the thickness of the hardened layer of the liquid crystal polymer to be formed on the supporting substrate is generally from 0.5 μm to 50 μm, preferably from 1 μm to 30 μm, and more preferably from 2 μm to 10 μm. The liquid crystal polymer hardened layer on the supporting substrate can be used as a layer integrated with the supporting substrate. Alternatively, such a layer can be separated from the supporting substrate and transferred to another substrate by using an adhesive or a pressure-sensitive adhesive. For improving the separation durability of the liquid crystal layer, the latter method is preferable.

Next, a collimating film (B) used in the present invention will be explained. The optical film of the present invention is produced by eliminating a sheet of collimating film as shown in FIG. 4, providing a light-condensing function to the bottom surface of the brightness enhancement film, and then laminating these two films. Consequently, the total thickness of the films can be decreased, and an air interface is removed so as to prevent stray light. As a result, the brightness enhancement film has an improved efficiency in reflecting and polarizing light; and thus, the brightness is enhanced. Any of the two methods exemplified below will be performed for laminating integrally a collimating film and a brightness enhancement film so as to provide a light-condensing function to the brightness enhancement film.

A first example includes preparation of a die of a prism, heat-transferring it to a transparent resin by heat-pressing, and integrating it with a brightness enhancement film via an adhesive or a pressure-sensitive adhesive. A second example includes coating a transparent resin directly on the bottom surface of the brightness enhancement film, and taking a pattern of the prism. Acrylic resin, polycarbonate resin, vinyl-chloride resin or the like can be used for the transparent resin. Acrylic resin is particularly preferred due to the high efficiency of visible light transmittance.

The optical film of the present invention (brightness enhancement film having a light-condensing function) has a thickness of 300 μm to 600 μm, preferably 300 μm to 400 μm. Generally, an acrylic resin for providing a light-condensing function to the brightness enhancement film has a thickness of 5 μm to 50 μm, while a collimating film has a thickness of about 150 μm. Therefore, the thickness of the optical film can be decreased by at least 100 μm by integrally laminating a brightness enhancement film and a collimating film according to the present invention. Moreover, while films in a lamination must be spaced since sticking may cause problems, elimination of one collimating film can lead to a further reduction in the thickness.

In the present invention, the adhesives or the pressure-sensitive adhesives used for laminating a brightness enhancement films or laminating a brightness enhancement film with a collimating film are based on suitable polymers such as, acrylic polymer, silicone-based polymer, polyester-based polymer, polyurethane-based polymer, polyamide-based polymer, and polyether-based polymer.

The above-described optical film according to the present invention can be provided with a pressure-sensitive adhesive layer for adhesion with other members such as a liquid crystal cell The pressure-sensitive adhesive layer can contain any suitable pressure-sensitive adhesives (such as, an acrylic adhesive or an urethane-based adhesive) in accordance with conventional techniques. Particularly, pressure-sensitive adhesive layers having a low moisture absorption coefficient and an excellent heat resistance are preferred from the aspect of prevention of foaming or peeling caused by moisture absorption, or prevention of decrease in the optical properties and warping of a liquid crystal cell caused by difference in thermal expansion coefficients. As a result, a high quality liquid crystal display having excellent durability can be produced. The pressure-sensitive adhesive layer can include fine particles to obtain optical diffusivity. The pressure-sensitive adhesive layer can be formed on any appropriate surfaces as required.

When the pressure-sensitive adhesive layer is exposed on a surface of the optical film, the pressure-sensitive adhesive layer is preferably covered with a separator by the time the pressure-sensitive adhesive layer is used so that contamination will be prevented. The separator can be made of an appropriate thin sheet by coating a peeling agent if required, and the peeling agent may be selected, for example, from a silicone-based agent, a long-chain alkyl-based agent, a fluorine-based agent, an agent comprising molybdenum sulfide or the like.

The above-described members composing the polarizing plate and the optical member, such as a polarizing film, a transparent protective film, an optical layer and a pressure-sensitive adhesive layer, can have ultraviolet absorption ability as a result of treatment with an ultraviolet absorber (such as, an ester salicylate compound, a benzophenone compound, a benzotriazole compound, a cyanoacrylate compound, and a nickel complex salt compound).

The optical film of the present invention can be preferably used for producing various apparatuses such as a liquid crystal display. It is preferred particularly for a use in a transmission type liquid crystal display having a backlight. A liquid crystal cell to compose the liquid crystal display can be selected arbitrarily from appropriate cells such as active matrix driving type represented by a thin film transistor, a simple matrix driving type represented by a twist nematic type and a super twist nematic type.

Usually, the optical film of the present invention is attached to a backside of a liquid crystal cell so as to be used. When the optical film of the present invention is provided in a liquid crystal display, an absorption dichroic polarizing plate forming the brightness enhancement film is usually disposed at a liquid crystal cell side, and a collimating film is disposed at a backlight side. When polarizing plates or other optical members are arranged on both surfaces of a liquid crystal cell, the polarizing plates or the optical members on the surfaces can be the same or can be varied. Moreover, for forming a liquid crystal display, one or at least two layers of appropriate members (such as, a prism array sheet, a lens array sheet, a reflection plate, an optical diffusion plate, a light-transmission plate and a backlight) can be arranged at proper positions.

EXAMPLES

The present invention will be described below more specifically by referring to Examples and Comparative Examples, though the present invention is not limited to the Examples.

In the Examples, the brightness enhancement film was prepared as described below by laminating a cholesteric liquid crystal layer, a λ/4 plate, and absorption dichroic polarizing plate in this order.

Example of Production of a Brightness Enhancement Film

A polyvinyl alcohol oriented film having a thickness of 0.1 μm was formed on a triacetylcellulose (TAC) film having a thickness of 50 μm. Subsequent to a rubbing treatment, cholesteric liquid crystal polymers, being 700 nm, 550 nm, and 400 nm in the central wavelengths of selective reflection, were formed successively in three layers on the oriented film. The respective layers had a thickness of about 3 μm. A λ/4 plate made of polycarbonate and 60 μm in thickness was adhered to this cholesteric liquid crystal layer by using an acrylic pressure-sensitive adhesive. Iodine-based polarizing plates (having acrylic pressure-sensitive adhesive layers formed on both surfaces thereof were attached to the plate by aligning the transmission axis so as to obtain a brightness enhancement film.

Although not specifically mentioned in this example, it is preferable that the prism shape of the collimating film is optimized depending on a light emission distribution of the backlight. For a use of two sheets of the collimating films, the prism axis of the collimating film may be arranged horizontally or perpendicularly with respect to incident light of the backlight. There is no specific limitation for the order of the horizontal and perpendicular laminations as long as the two sheets are arranged perpendicular to each other.

Examples will be described below, referring to attached drawings. In the drawings, 5 indicates a polarizing plate, 6 indicates a liquid crystal cell, 10 indicates a reflection plate, and 11 indicates a light source (a lamp). These components are not specified further in the respective Examples.

SINGLE-LAMP-TYPE BACKLIGHT

Example 1

A die having a prism pattern with a point angle of 45° and a 50 μm pitch was prepared. Separately, a brightness enhancement film made of triacetylcellulose (TAC) having a multi-layered cholesteric liquid crystal polymer film was prepared in accordance with the above-described method. Acrylic resin 8 μm in thickness was coated on a surface of the brightness enhancement film, i.e., a surface opposite to the multi-layered film. Then, the pattern was heat-transferred with heat-pressing by using the die so as to obtain a brightness enhancement film having a light-condensing function.

Figure 1:
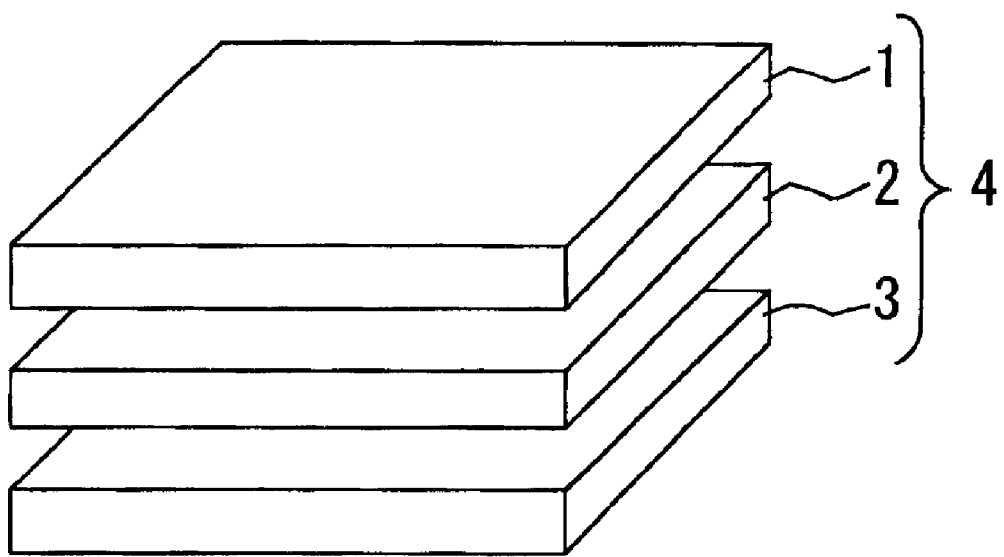
FIG. 1 is a schematic view showing an embodiment of the brightness enhancement film of the present invention.
Figure 2:
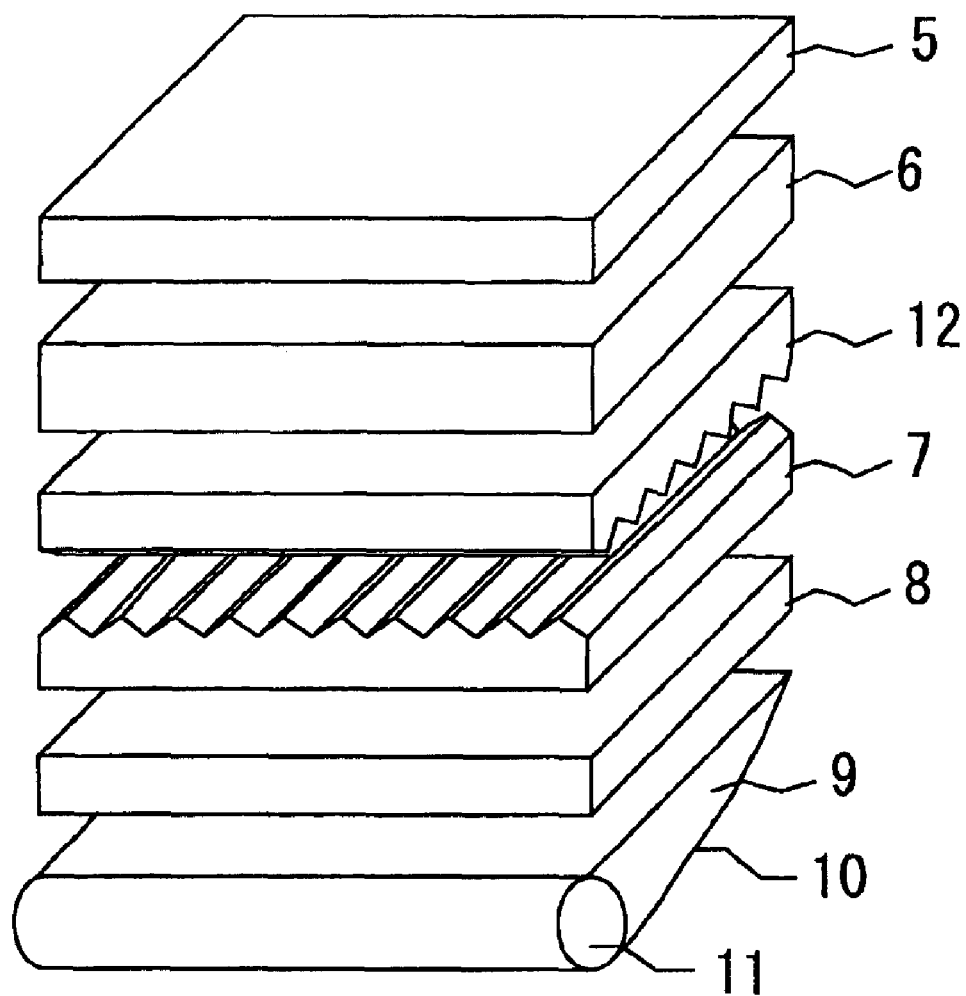
FIG. 2 is a schematic view showing an embodiment of a single-lamp-type liquid crystal display of the present invention.

A diffusion plate (8) made of an acrylic resin was mounted on a light-transmission plate (9) made of polymethyl-methacrylate. A sheet of collimating film (7) made of acrylic resin was mounted thereon. A brightness enhancement film (12) of the present invention, having a light-condensing function, was superposed on the film so as to obtain a liquid crystal display as shown in FIG. 2. The prism axis of the prism of the brightness enhancement film (12) having a light-condensing function was designed to cross the incident light of the backlight at a right angle.

Example 2

A collimating film made of an acrylic film having a prism pattern with a prism point angle of 45° was adhered to a brightness enhancement film prepared in the above-described method, by using an acrylic pressure-sensitive adhesive, and dried to obtain a brightness enhancement film having a light-condensing function. Subsequently, a liquid crystal display as shown in FIG. 2 was prepared in a manner similar to the Example 1. The prism axis of the prism of the brightness enhancement film (12) having a light-condensing function was designed to cross the incident light of the backlight at a right angle.

Comparative Example 1

A diffusion plate (8) was mounted on a light-transmission plate (9). Then, two sheets of the collimating films (7) as described in Example 1 were successively superposed thereon. Consequently, a liquid crystal display having the configuration shown in FIG. 3 was produced in a manner similar to Example 1.

Comparative Example 2

A diffusion plate (8) was mounted on a light-transmission plate (9). Then, two sheets of the collimating films (7) as described in Example 1 were successively superposed thereon; and furthermore, a sheet of brightness enhancement film (4) prepared in the above-described method was superposed thereon. Consequently, a liquid crystal display having the configuration shown in FIG. 4 was produced in a manner similar to Example 1.

Double-Lamp-Type-Backlight

Example 3

Figure 5:
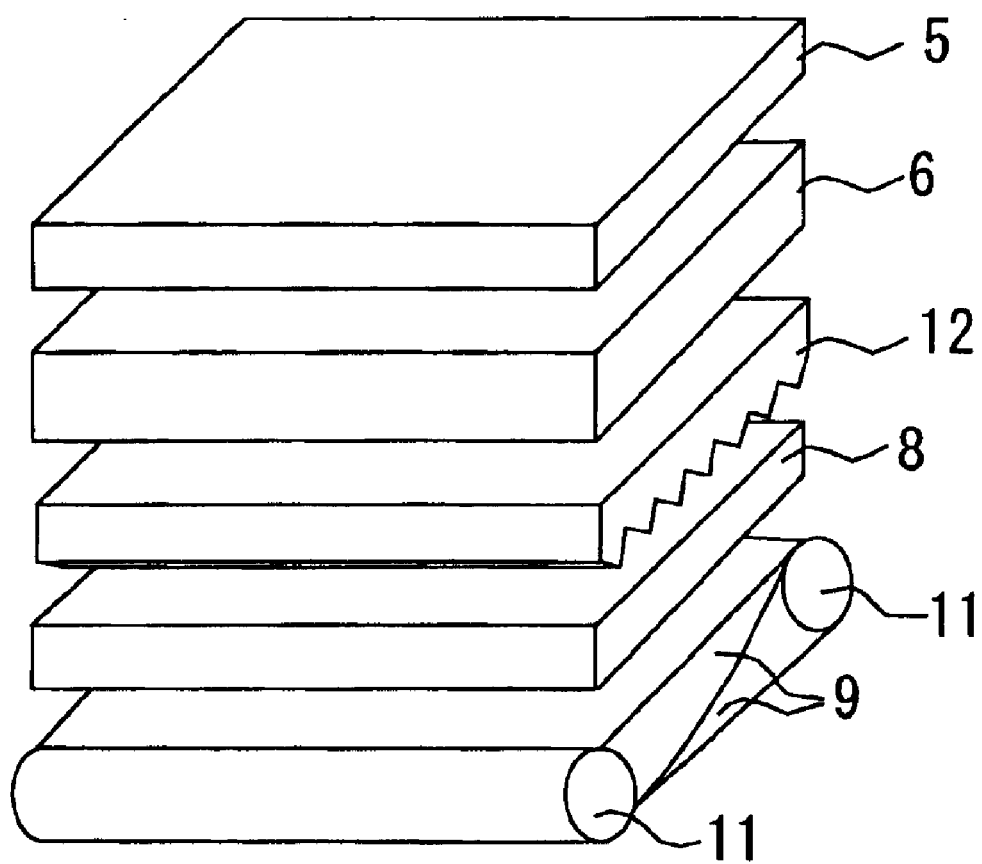
FIG. 5 is a schematic view showing an embodiment of a double-lamp-type liquid crystal display of the present invention.

A diffusion plate (8) made of an acrylic resin was mounted on a light-transmission plate (9) made of polymethyl-methacrylate. A brightness enhancement film (12) having a light-condensing function as described in Example 1 was superposed on the film so as to obtain a liquid crystal display as shown in FIG. 5. The prism axis of the prism of the brightness enhancement film having a light-condensing function was designed to cross the incident light of the backlight at a right angle.

Example 4

A diffusion plate (8) made of an acrylic resin was mounted on a light-transmission plate (9) made of polymethyl-methacrylate. A brightness enhancement film (12) having a light-condensing function as described in Example 2 was superposed on the film so as to obtain a liquid crystal display as shown in FIG. 5. The prism axis of the prism of the brightness enhancement film having a light-condensing function was designed to cross the incident light of the backlight at a right angle.

Comparative Example 3

Figure 6:
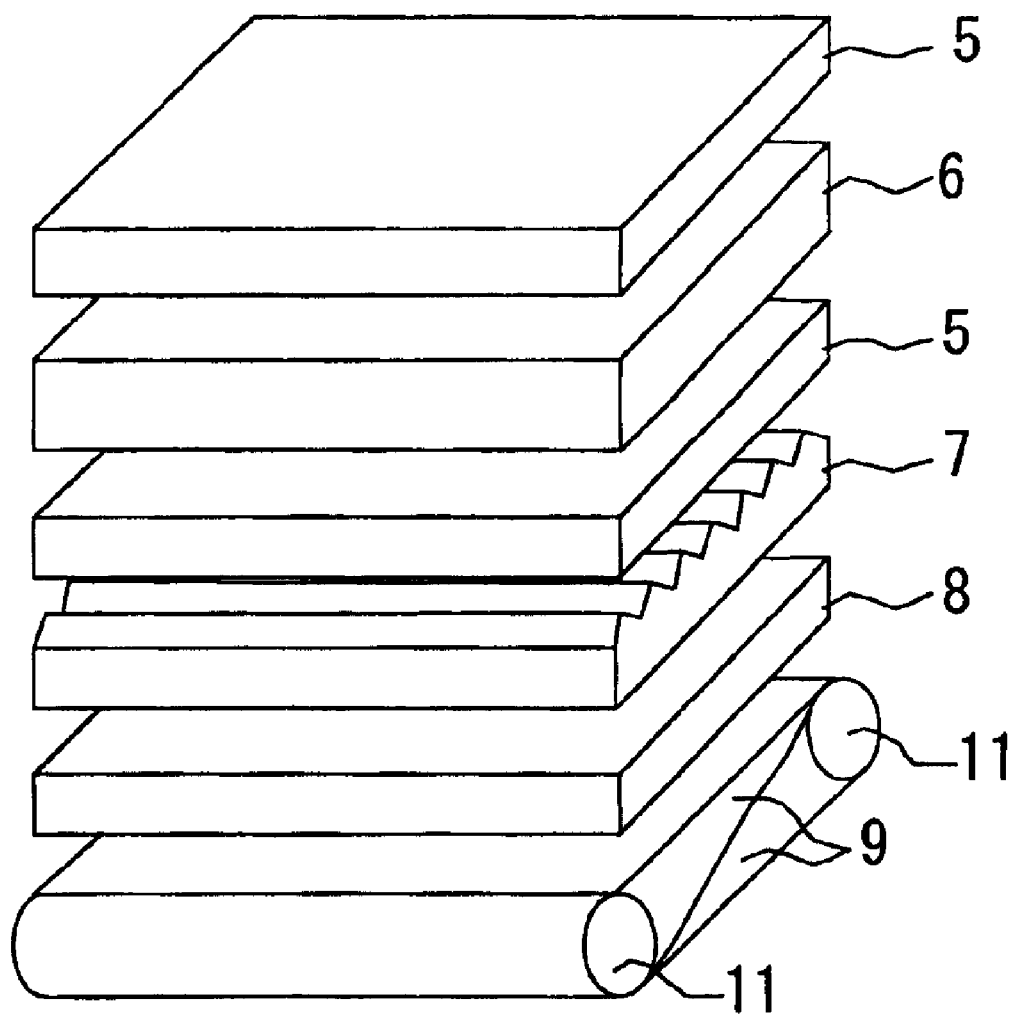
FIG. 6 is a schematic view showing a conventional double-lamp-type liquid crystal display.

A diffusion plate (8) was mounted on a light-transmission plate (9). Then, a sheet of collimating film (7) as described in Example 1 was superposed thereon. Consequently, a liquid crystal display configured as shown in FIG. 6 was produced in a manner similar to Example 1.

Comparative Example 4

Figure 7:
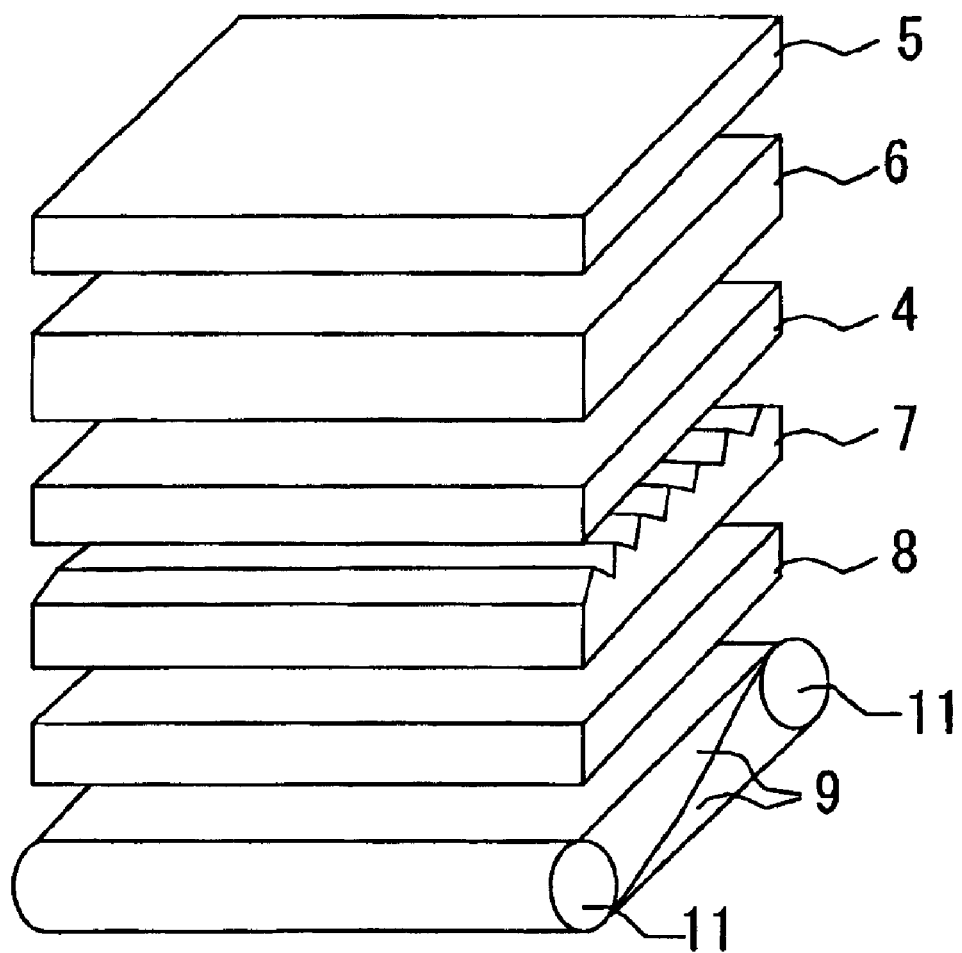
FIG. 7 is a schematic view showing a conventional double-lamp-type liquid crystal display.

A diffusion plate (8) was mounted on a light-transmission plate (9). Then, a sheet of collimating film (7) as described in Example 1 was superposed thereon; and furthermore, a sheet of brightness enhancement film (4) was superposed thereon. Consequently, a liquid crystal display configured as shown in FIG. 7 was produced in a manner similar to Example 1.

Evaluation

Regarding the liquid crystal displays (FIG. 2-FIG. 7) produced in the Examples 1–4 and Comparative Examples 1–4, brightness was evaluated using a brightness measurement device (BM-7 manufactured by TOPCOM) for the configuration below the liquid crystal cell 6 (namely, the configuration excepting the polarizing plate 5 and the liquid crystal cell 6). The results are shown in Table 1.

TABLE 1

Figure 3:
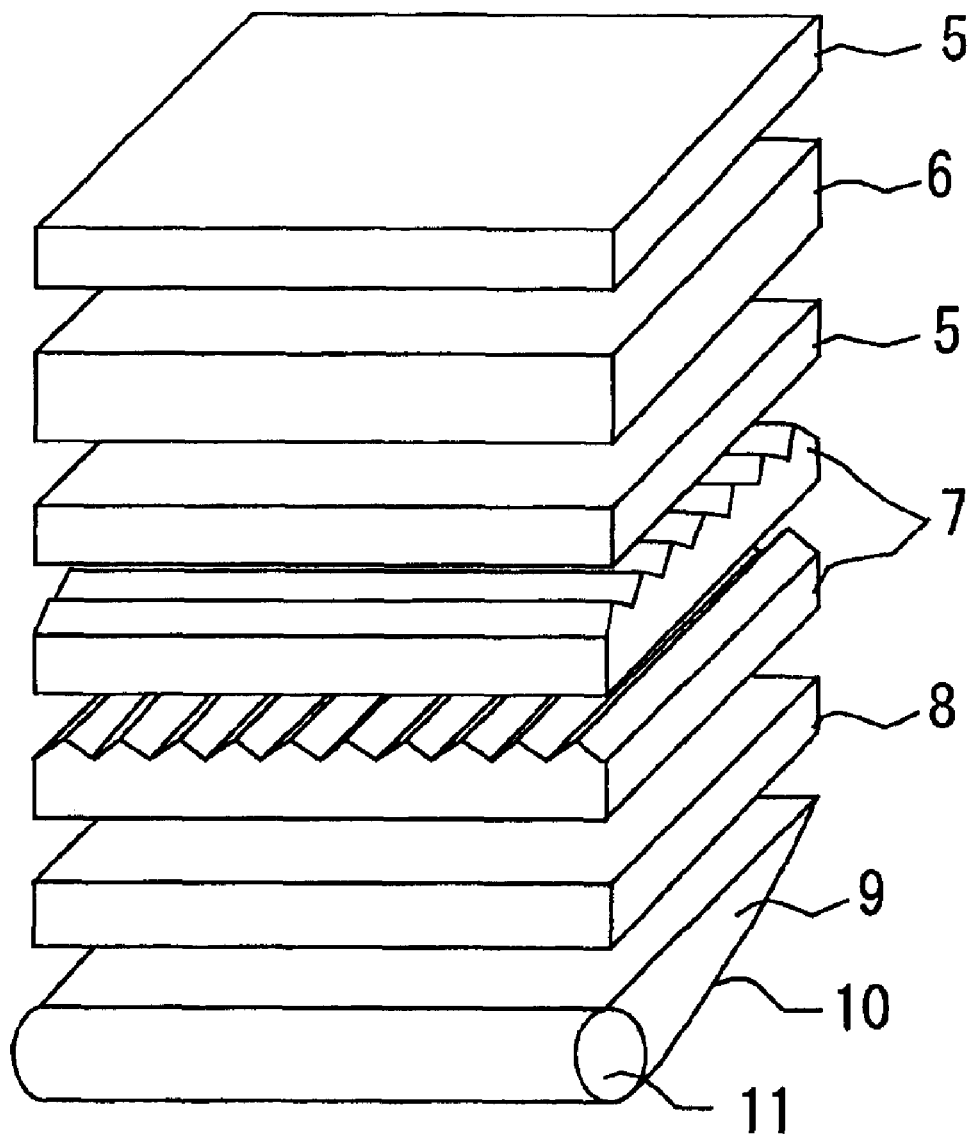
FIG. 3 is a schematic view showing a conventional single-lamp-type liquid crystal display.
Figure 4:
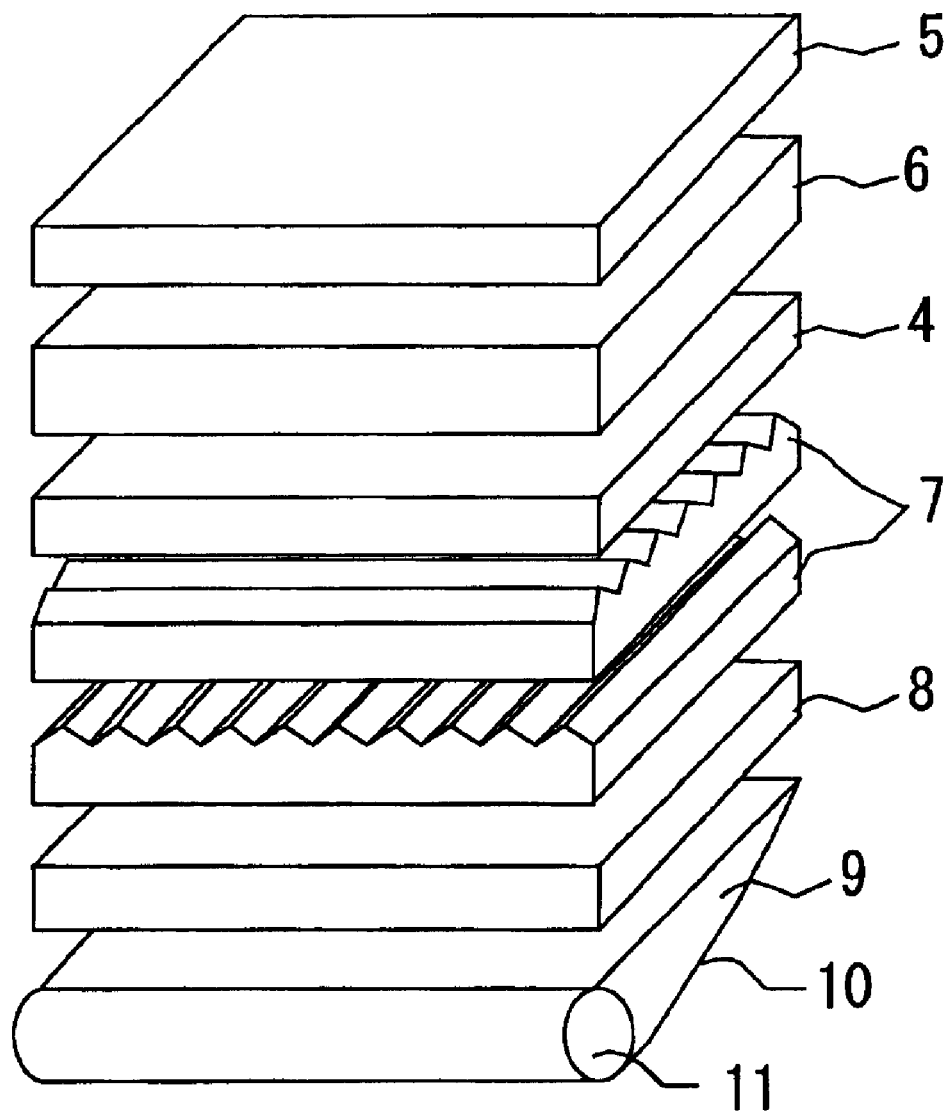
FIG. 4 is a schematic view showing a conventional single-lamp-type liquid crystal display.

| | Backlight | Brightness (cd/cm$^2$) | Embodiment |
|---|---|---|---|
| Example 1 | Single-lamp-type | 140 | FIG. 2 |
| Example 2 | Single-lamp-type | 139 | FIG. 2 |
| Comparative Example 1 | Single-lamp-type | 100 | FIG. 3 |
| Comparative Example 2 | Single-lamp-type | 125 | FIG. 4 |
| Example 3 | Double-lamp-type | 270 | FIG. 5 |
| Example 4 | Double-lamp-type | 267 | FIG. 5 |
| Comparative Example 3 | Double-lamp-type | 180 | FIG. 6 |
| Comparative Example 4 | Double-lamp-type | 245 | FIG. 7 |

The results shown in Table 1 indicate that when a single-lamp-type backlight is used and the brightness provided by the configuration of FIG. 3 using two sheets of the collimating films is defined as 1, the brightness is enhanced to 1.4 times by eliminating the lower polarizing plate and one of the collimating films and by inserting one sheet of the brightness enhancement film (FIG. 2) having a light-condensing function according to the present invention.

Similarly, when a double-lamp-type backlight is used and the brightness provided by the configuration of FIG. 6 is defined as 1, the brightness is enhanced to 1.5 times by inserting one sheet of the brightness enhancement film (FIG. 5) having a light-condensing function according to the present invention in place of the lower polarizing plate and one of the collimating films.

As described above, spacing between the films can be reduced by removing a sheet of the collimating film and providing a light-condensing function to the brightness enhancement film. As a result, the brightness enhancement film can have an improved efficiency in reflecting and polarizing light so as to enhance the brightness, while maintaining the light-condensing function.

As described above, since the optical film according to the present invention is produced by laminating integrally a brightness enhancement film and a collimating film; and especially, since the integration via an adhesive or a pressure-sensitive adhesive serves to remove the air interface, stray light is reduced, the reflection efficiency of polarized light is raised, and the brightness is enhanced. That is, when the brightness enhancement film and the collimating film are merely mounted downward, an air interface is created to cause stray light. However, the air interface is removed by integrating the brightness enhancement film and the collimating film via an adhesive or a pressure-sensitive adhesive, resulting in reduction of the stray light. As a result, a liquid crystal display with excellent efficiency in use of light and providing a bright display can be achieved by using the optical film of the present invention in the liquid crystal display.

The above-described Examples are merely for explaining the technology of the present invention. The present invention is not limited to these Examples. The present invention can be implemented in various alternatives within the concept of invention and recitation of claims, and should be interpreted broadly.

What is claimed is:

1. A liquid crystal display having an optical film provided on at least one surface of a liquid crystal cell,
the optical film comprising a brightness enhancement film (A) that separates natural light into transmitted light and reflected light and a collimating film (B) having a uneven portion on one surface thereof, said collimating film having a surface facing a display side of the liquid crystal display and a surface opposed to the display side of the liquid crystal display;
wherein the brightness enhancement film (A) and the collimating film (B) are integrally laminated with each other so that the uneven portion of the collimating film is provided on the surface opposed to the display side of the liquid crystal display.

2. The liquid crystal display according to claim 1, wherein the light passing through the brightness enhancement film (A) is linearly-polarized light.

3. The liquid crystal display according to claim 1, wherein the collimating film (B) comprises a prism portion.

4. The liquid crystal display according to claim 1, wherein the brightness enhancement film (A) is formed by integrally laminating a cholesteric liquid crystal layer, a λ/4 plate, and an absorption dichroic polarizing plate in this order.

5. The liquid crystal display according to claim 4, wherein the cholesteric liquid crystal layer is formed by supporting an oriented film of a cholesteric liquid crystal polymer or an oriented liquid crystal layer thereof on a film substrate.

6. The liquid crystal display according to claim 4, wherein the cholesteric liquid crystal layer comprises at least two liquid crystal layers laminated with each other, and the liquid crystal layers have different reflection wavelengths.

7. The liquid crystal display according to claim 1, wherein the brightness enhancement film (A) and the collimating film (B) are integrally laminated via either an adhesive or a pressure-sensitive adhesive.

8. The liquid crystal display according to claim 1, wherein the brightness enhancement film is applied with a resin to which a prism pattern is transferred for providing a light condensing function.

9. The liquid crystal display according to claim 1, wherein the collimating film comprises a prism portion and converges light emitted at an angle in a range of 30° to 80° with respect to a normal line to a vicinity of the normal line.

10. The liquid crystal display according to claim 9, wherein the prism of the collimating film has a chevron shape with an apex angle in a range of 20° to 80°.

11. The liquid crystal display according to claim 9, wherein the prism of the collimating film has a wave shape.

12. The liquid crystal display according to claim 1, further comprising a backlight.

13. A liquid crystal display according to claim 1, wherein said optical film has a side facing a display side of the liquid crystal display and a side opposed to the display side of the liquid crystal display, and the collimating film is on a the side of the optical film opposed to the display side of the liquid crystal display.

14. The liquid crystal display according to claim 13, wherein the light passing through the brightness enhancement film (A) is linearly-polarized light.

15. The liquid crystal display according to claim 14, wherein the brightness enhancement film (A) is a laminated body of a cholesteric liquid crystal layer and a λ/4 plate.

16. The liquid crystal display according to claim 13, wherein the collimating film (B) comprises a prism portion.

17. The liquid crystal display according to claim 13, wherein the brightness enhancement film (A) that separates natural light into light transmitted as linearly-polarized light and reflected light containing reusable circularly-polarized light and the collimating film (B) having a prism portion on one surface thereof are integrally laminated with each other.

18. The liquid crystal display according to claim 13, wherein the brightness enhancement film (A) is formed by integrally laminating a cholesteric liquid crystal layer, a $\lambda/14$ plate, and an absorption dichroic polarizing plate in this order.

19. The liquid crystal display according to claim 18, wherein the cholesteric liquid crystal layer is formed by supporting an oriented film of a cholesteric liquid crystal polymer or an oriented liquid crystal layer thereof on a film substrate.

20. The liquid crystal display according to claim 18, wherein the cholesteric liquid crystal layer comprises at least two liquid crystal layers laminated with each other, and the liquid crystal layers have different reflection wavelengths.

21. The liquid crystal display according to claim 13, wherein the brightness enhancement film (A) and the collimating film (B) are integrally laminated via either an adhesive or a pressure-sensitive adhesive.

22. The liquid crystal display according to claim 13, wherein the brightness enhancement film is applied with a resin to which a prism pattern is transferred for providing a light condensing function.

23. The liquid crystal display according to claim 13, wherein the collimating film comprises a prism portion and converges light emitted at an angle in a range of 30° to 80° with respect to a normal line to a vicinity of the normal line.

24. The liquid crystal display according to claim 13, wherein the prism of the collimating film has a chevron shape with an apex angle in a range of 20° to 80°.

25. The liquid crystal display according to claim 23, wherein the prism of the collimating film has a wave shape.

* * * * *